United States Patent [19]
Camp

[11] Patent Number: 5,114,347
[45] Date of Patent: May 19, 1992

[54] MATHEMATICAL FUNCTION DEMONSTRATOR BOARDS

[76] Inventor: Mead B. Camp, 5595 Gloucester Way, Riverside, Calif. 92506

[21] Appl. No.: 681,934

[22] Filed: Apr. 8, 1991

[51] Int. Cl.$^5$ .............................................. G09B 23/02
[52] U.S. Cl. .................... 434/214; 434/215; 434/211; 434/188
[58] Field of Search ............... 434/215, 214, 211, 433, 434/201, 188

[56] References Cited

U.S. PATENT DOCUMENTS

| | | | |
|---|---|---|---|
| 2,509,301 | 5/1950 | Henry, Sr. | 35/30 |
| 3,021,058 | 2/1962 | Horton | 235/61 |
| 3,452,456 | 7/1969 | Tinman | 434/211 |
| 3,453,747 | 7/1969 | Saunders | 35/30 |
| 3,826,021 | 7/1974 | De Andrea | 35/34 |
| 3,827,163 | 8/1974 | Grimes | 35/34 |
| 4,435,162 | 3/1984 | Schoenwald | 434/215 |
| 4,705,478 | 11/1987 | Djali | 434/215 |

FOREIGN PATENT DOCUMENTS

| | | | |
|---|---|---|---|
| 0312300 | 10/1971 | U.S.S.R. | 434/211 |
| 0995111 | 2/1983 | U.S.S.R. | 434/211 |

Primary Examiner—Eugene Mancene
Assistant Examiner—Jeffrey A. Smith
Attorney, Agent, or Firm—Roberts and Quiogue

[57] ABSTRACT

An electromechanical demonstrator board of one or more of the six trigonometric functions. The board is powered electrically by a battery and mechanically by a hand crank which drives a pointer and contact arm. The circuits include light emitting diodes (LEDs) arranged into three groups. The first group represents a unit circle. The second group is on a vertical segment, and the third group is on the path of the function and the horizontal axis. The first group of LEDs indicates particular angle measures on the unit circle. In the second group, vertically oriented LEDs indicate harmonic motion. The third group of LEDs demonstrates a graph of the trigonometric function and the measure of linear movement related to rotation on the unit circle.

26 Claims, 8 Drawing Sheets

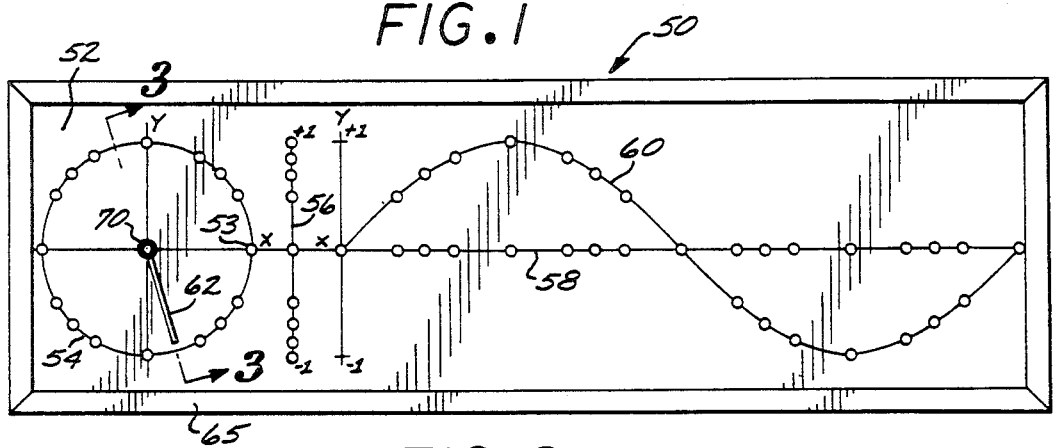
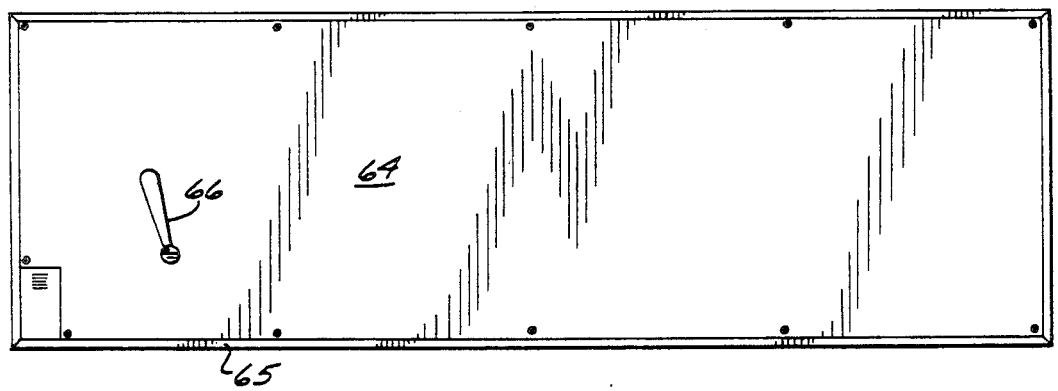
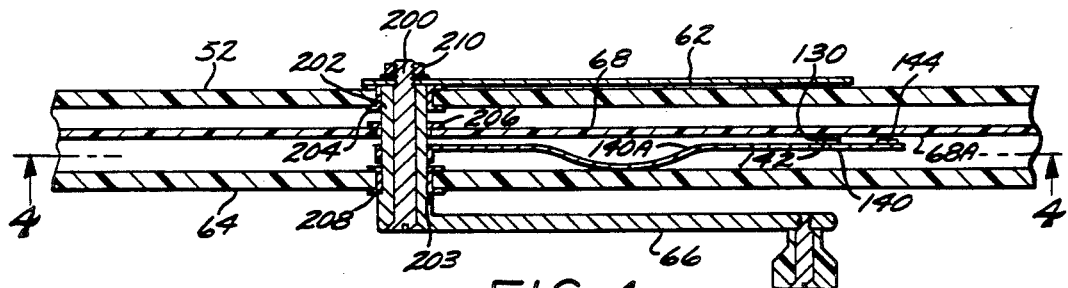
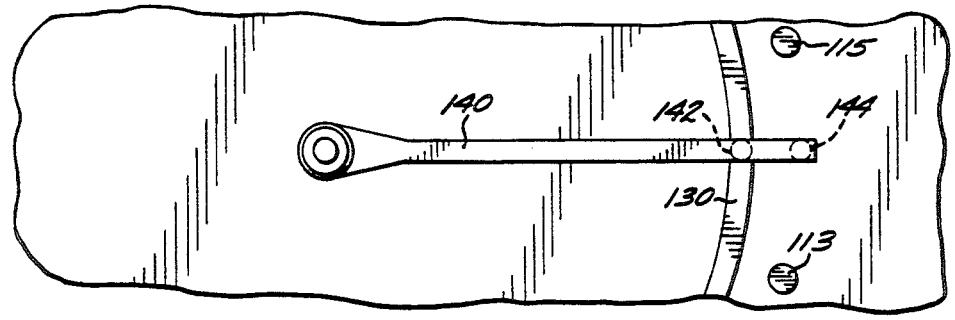

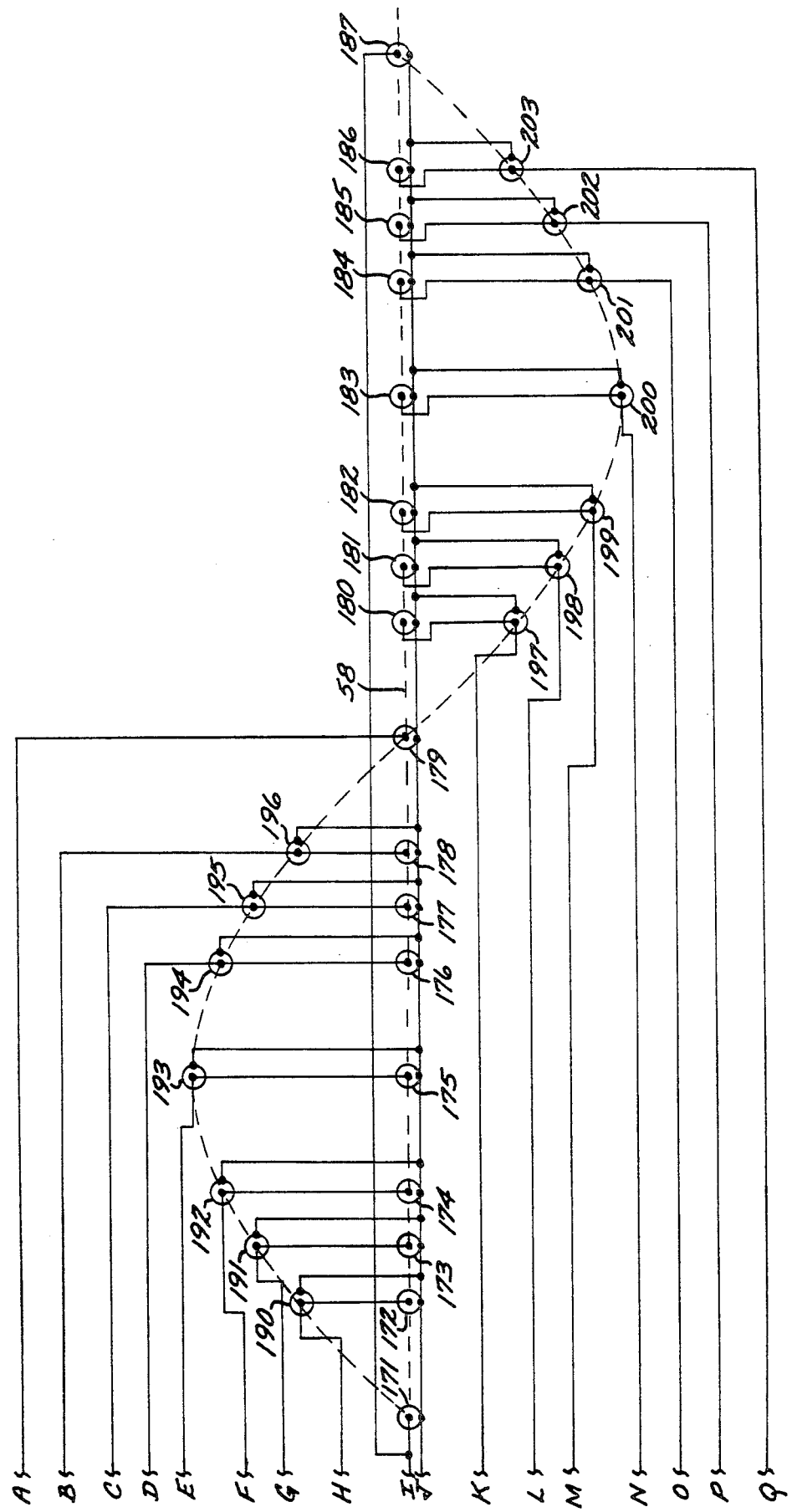

MATHEMATICAL FUNCTION DEMONSTRATOR BOARDS

BACKGROUND OF THE INVENTION

The present invention relates to teaching aids for trigonometric functions.

The six trigonometric functions have been taught for centuries by using teaching aids such as the chalkboard, charts, overhead projectors and other methods. Teachers need as many avenues and approaches as possible to communicate the meaning of the functions to students. There are no visual aids known to applicant, however, which illustrate the trigonometric functions by means of flashing lights.

Exemplary known apparatus are shown in the following U.S. Pat. Nos.:
2,509,301 Visual Aid for Trigonometry (Henry, Sr.)
3,021,058 Mathematical Instruments (Horton)
3,453,747 Sine Wave Generator (Saunders)
3,826,021 Device for Demonstrating and Calculating Trigonometric Functions (De Andrea)
3,827,163 Trigonometry Teaching Device (Grimes)
4,435,162 Trigonometry Visualizers and Method of Making Same (Schoenwald)
4,705,478 Superimposed Transparencies Used in Education (Djali).

U.S. Pat. No. 3,453,747 discloses a mechanically operated sine wave generator for visually demonstrating the algebraic addition of two or more sine waves having similar or dissimilar periods and amplitudes as a single undulating wave form. Sine wave motion may be imparted to a chalk stick by the mechanism, in which the algebraic addition of two or more waves may be shown.

U.S. Pat. No. 3,826,021 describes a device for demonstrating and calculating trigonometric functions. The device includes a planar member having a unit circle inscribed thereon and an angular scale associated with the circle to indicate the angle of an arc measured thereon. The planar member also has a vertically extending ordinate corridor defined by the ordinate axis and tangent line, and a horizontally extending abscissa corridor defined by the abscissa axis and cotangent line. A transparent cursor member having a radius vector hairline is pivotally mounted at the origin of the unit circle with the hairline passing through the origin and extending a length at least as great as that of the corridors, and is adapted to be pivotally moved through at least a 90 degree quadrant of the unit circle. The tangent, cotangent, secant and cosecant functions for a given angle may be demonstrated by visual observation of the hairline within the corridors at its points of intersection with the tangent and cotangent lines. The device can also include means for indicating the sine and cosine functions within the unit circle to permit the demonstration of all the trigonometric functions on one device.

U.S. Pat. No. 3,827,163 describes a trigonometry teaching device. It includes a platform, a rotatable transparent disc and a transparent slide member. The slide member moves linearly in response to disc rotation. Circular and linear scales are imprinted on the three parts.

U.S. Pat. No. 4,435,162 discloses a trigonometry visualizer which includes a pair of circular discs connected at their centers for relative rotation coaxially of one another. The upper disc has a large circle disposed coaxially of the common axis of the discs. The lower disc has on its face a smaller circle the diameter of which is one half that of the circle on the upper disc. The circle on the lower disc is radially offset from the axis of the discs by an amount equal to its radius so that it registers tangentially at one diametral side with the circle on the upper disc, and at its opposite side with the common axis of the discs. A pointer on the periphery of the lower disc is viewable through the upper disc, and when the discs are rotated relative to each other, registers selectively with a plurality of graduations on the upper disc which divide the large circle into its degree values.

U.S. Pat. No. 2,509,301 describes a visual study aid for trigonometry, which includes a disc member having a plurality of arcuate slots formed therein. A single block slides over one face of the disc, and a plurality of interconnected arms are journaled in the block and extend through the slots. The arms are positioned in selected angular relationships to each other on movement of the block relative to the disc member, one of the arms constituting a radius arm and being journaled at opposite ends in the block and disc member respectively. The other arms are each journaled at one end in the block and at the other end are pivotally connected to the first end of the radius arm.

U.S. Pat. No. 3,021,058 describes a mathematical instrument for indicating in one operation the six trigonometric functions of any given angle. It comprises a back member having thereupon scales indicating the angles and the values of their trigonometric functions. Rotatably mounted over the back member is an elongated vector operable to correlate the angles and the values of the functions. In order to correlate completely the angles with all of the functions, an intersector member is pivotally attached to the vector and cooperates therewith in such fashion that by a single setting of the vector to the desired angle, all six trigonometric functions of the angle may be read from the vector and intersector positions.

U.S. Pat. No. 4,705,478 describes superimposed transparencies used in demonstrating geometrical relationships.

SUMMARY OF THE INVENTION

A trigonometric function demonstrator apparatus is disclosed, with a front surface panel and at least two groups of selectively activatable light emitters, such as LEDs. The first group of LEDs is disposed at selected locations around the periphery of a unit circle defined on the front surface panel. The second group of LEDs is being disposed in relation to coordinates defined on said front surface panel to indicate the value of said trigonometric function at particular angles indicated by said first group of light emitters. Thus, the LEDs of the second group indicate values of the function, for example, the sine or cosine function.

The apparatus further includes angle pointing means on the front surface panel, centered on the center of said unit circle and being rotatable about the unit circle to illustrate selected angles on the unit circle.

An operator manipulated means is provided for mechanically rotating the pointing means and for activating selected corresponding ones of the first and second groups of LEDs the angle pointing means is pointing to particular angles about the unit circle. In the disclosed embodiment, the operator manipulated means comprises a hand crank extending from a back panel surface of the apparatus.

The demonstrator apparatus is preferably constructed of a size to permit it to be held by the operator, with a battery to power to activate the light emitters.

A further feature of the demonstrator apparatus is a third group of selectively activatable light emitters or LEDs. The third group is disposed along a vertical segment equal in length to the diameter of the unit circle, arranged to indicate the value of the trigonometric function for respective corresponding angles indicated by the first group of light emitters. The operator manipulated means further comprises means for activating selected corresponding ones of the third group corresponding to the value of the trigonometric function for the respective corresponding angles.

The demonstrator function board can further be arranged to illustrate two or more trigonometric functions.

BRIEF DESCRIPTION OF THE DRAWING

These and other features and advantages of the present invention will become more apparent from the following detailed description of exemplary embodiments thereof, as illustrated in the accompanying drawings, in which:

FIG. 1 is a plan view of a preferred embodiment of the demonstrator board for demonstrating the sine wave in accordance with the invention.

FIG. 2 is a rear view of the demonstrator board of FIG. 1.

FIG. 3 shows a cross-sectional view of the demonstrator board, taken along line 3—3 of FIG. 1, illustrating how a printed circuit (PC) board is sandwiched between the face cover and the back panel.

FIG. 4 is a partially-broken-away view taken in the direction of line 4—4 of FIG. 3, showing the contact wiper arm making contact with contact terminals on the PC board.

FIGS. 6A-6B are schematic layout diagrams illustrating the locations of the various LEDs on the demonstrator board of FIG. 1.

DETAILED DESCRIPTION OF THE PREFERRED EMBODIMENTS

Figure 5:
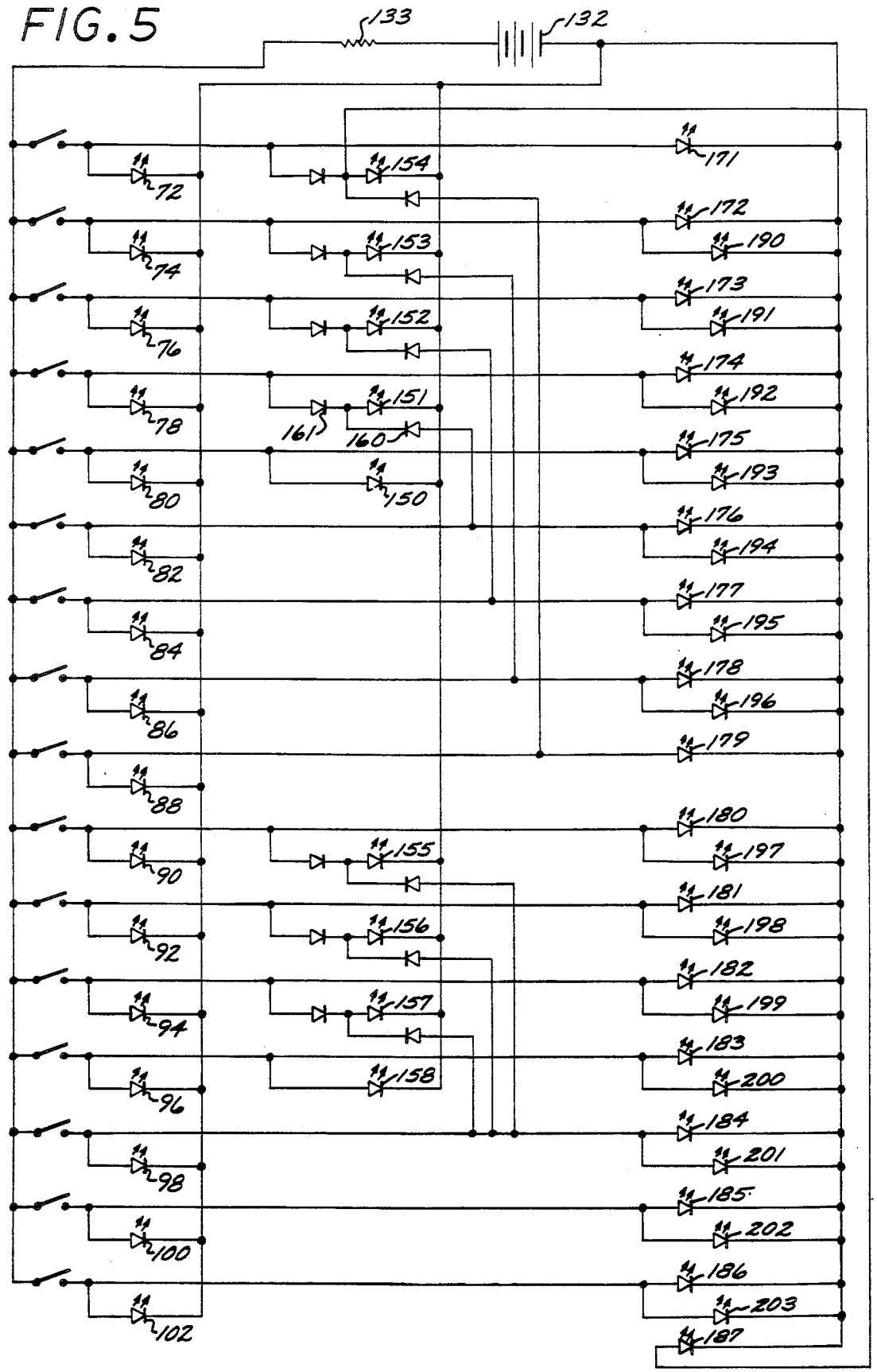
FIG. 5 is a schematic diagram of the circuitry comprising the contact board of FIG. 1.

A first embodiment of a demonstrator board embodying the invention, a sine wave demonstrator board 50, is shown in FIGS. 1-6. The board 50 is characterized by a planar flat first surface member or face plate 52, and a plurality of visible light emitting diodes (LEDs). Preferably, the board 50 is of a size which can be held by the instructor and which still is of sufficient size to allow students throughout the classroom to see the display of the board 50; exemplary dimensions of the board are 10 inches wide by 32 inches long.

A pointer 62 is rotatable about a unit circle 54 defined on the front surface member 52. The LEDs are divided into three groups. The first group is placed on the unit circle 54. The second group is located on a segment 56 which has a length equal in measure to the diameter of the unit circle 54. The third group is found on the graph of the trigonometric function, in this case the sine function, and on the horizontal axis 58.

FIG. 2 shows the back side of the board 50, with the back cover 64 and the hand crank 66. The angular position of the hand crank 66 will determine which of the LEDs on the front surface member 52 are illuminated.

In operation, the board 50 will give learners a visual concept of measures of angles and the values of the trigonometric sine function related to those angles. The harmonic motion of lights flashing on the vertical segment 56 when turning the hand crank 66 at a fast rate will demonstrate the increasing and decreasing numbers between the maximum and minimum of 1 and −1. The flashing of lights at intervals on the graph 60 will represent values of the sine function at special angles of rotation on the unit circle 54.

In this exemplary embodiment, the specific location of LEDs on the graph 60 will emphasize specific measures of 0, $\frac{1}{2}$, $\sqrt{2}/2$, $\sqrt{3}/2$, 1 and the negative of those values. At the moment the LED for a specific number is turned on, the learner can observe the position of the point on the unit circle 54 where another LED is turned on. He can then visually determine the measure of rotation that has taken place.

While holding the board 50 or with it supported, e.g., on a table or easel, the instructor can turn the hand crank 66 at a fast rate which will flash many LEDs rapidly. Many LEDs are used but only a few are activated at any given instant of time. The students' eyes will follow the graph 60 of the sine function as it progresses through one cycle then begin again through another. The movement fascinates the observer, interest is elevated in the subject matter, and learning follows.

The face of the demonstrator board can have numbers printed to indicate special values, or the numbers may be omitted, as in the case of the board 50. Teachers can then raise questions as to values for various angles.

While holding the board 50 or with it supported, e.g., on a table or easel, the instructor using the demonstrator board in accordance with the invention will have complete control of the angles made by mechanical means. The contact arm 140 can be rotated to any desired position by turning the hand crank 66. Flashing lights will indicate the direction of rotation. The direction of the flashing LEDs on the vertical line segment will indicate whether the value of the function is increasing, decreasing, at maximum, or at minimum.

Activated lights on the graph and the horizontal axis will show the length of the segment which represents the number value of the function at that angle on the unit circle.

The unit circle can be thought of as an alternator. The operator of the hand crank can rotate the contact arm at a fast rate which will cause the harmonic motion on the vertical segment to simulate AC current.

Figure 6A:
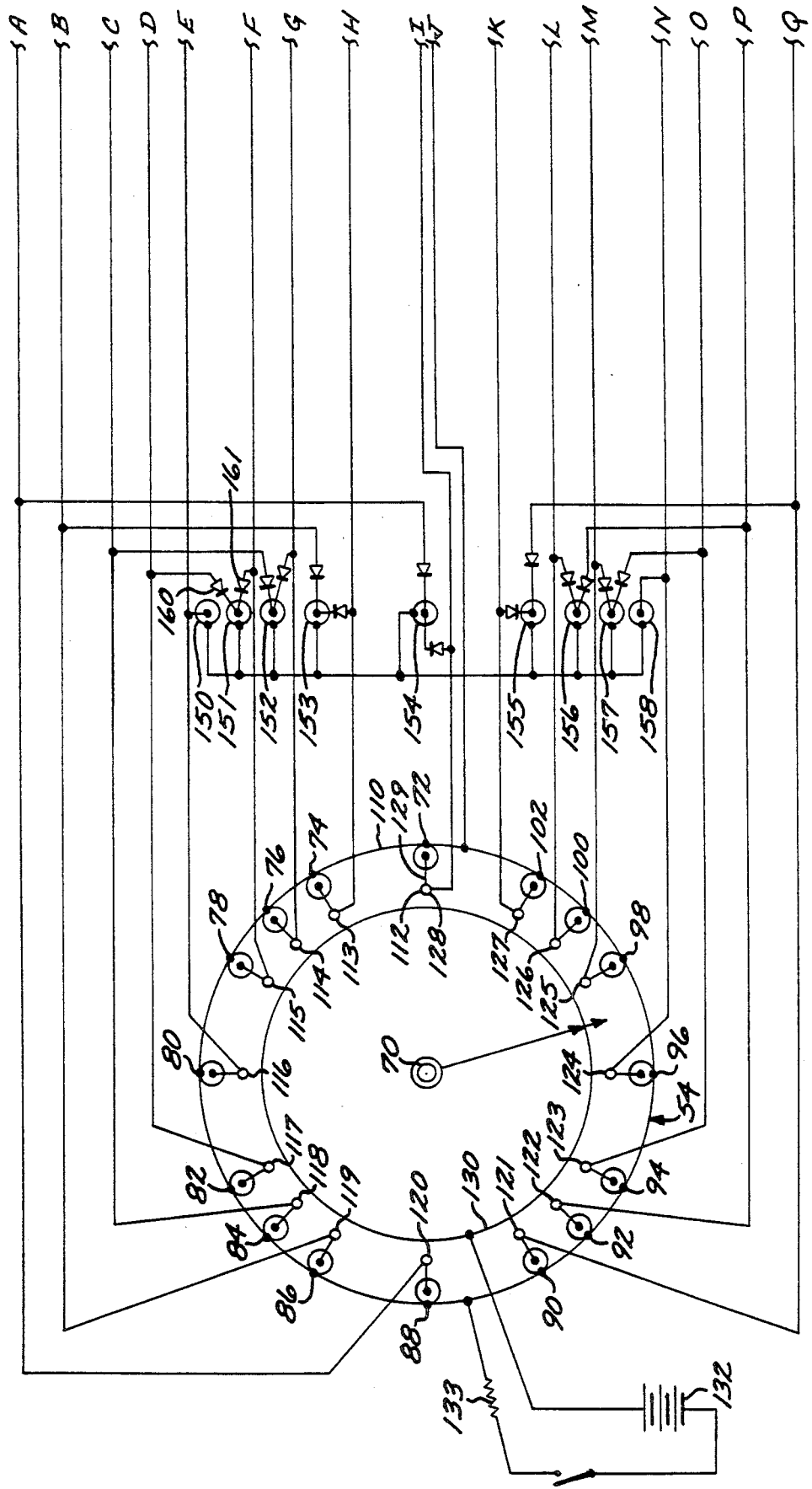

Referring to FIG. 6A, the radius of the unit circle 54 can be determined by the distance from the center point 70 to LED 74. The circle 54 is divided into six congruent arcs which will have a measure of 60 degrees each and LEDs 72, 78, 82, 88, 94 and 98 are located at the end points of the respective 60 degree arcs. Each 60 degree arc is bisected by an LED, respectively, 74, 80, 86, 90, 96, 102, to thereby divide the circle 54 into twelve arcs of 30 degrees measure each. Three 30 degree arcs total 90 degrees. The four 90 degree arcs of the circle 54 starting from LED 72 are bisected by LEDs 76, 84, 92 and 100, respectively. This will divide the circle into eight arcs with each measuring 45 degrees, with LEDs 72, 76, 80, 84, 88, 92, 96 and 100 disposed at the end points of the 45 degree arcs.

Thus, sixteen special locations on the unit circle 54 have been determined, and LEDs are placed at each of those locations. A wiring trace 110 is defined on the lower surface 112 of a printed circuit (PC) board 68, and is used to ground all sixteen LEDs located on the periphery of the unit circle 54; i.e., the ring 110 is connected to the negative terminal of 9-volt battery 132. Sixteen contacts 113-128 are formed on the lower surface 112 of board 68 near the corresponding LEDs disposed on the unit circle 54. Each contact point is positioned on a radius between the center of the circle 54 and the corresponding LED. Each contact point is connected via a wiring trace to the anode of its corresponding LED. For example, contact point 128 is connected by wiring trace 129 to the anode of LED 72. The cathode of each LED is connected to the wiring trace 110.

Near the contact points 113-128 is a copper ring 130, forming the positive electrode to which the positive side of the battery 132 is connected through 188 ohm resistor 133. As shown in FIG. 3, a conductive contact arm 140 is mounted on the shaft 202 comprising the hand crank 66. The contact arm 140 is mechanically turned by the hand crank 66. A pair of contacts 142 and 144 are formed on the side of the arm 140 adjacent the surface 68A of the PC board 68. The contact 144 is urged into contact with the copper ring 130. The contact 142 serves to contact particular ones of the respective contacts 113-128 in dependence on the position of the wiper arm 140, and thus completes the circuit between the copper ring 130 and a particular contact point 113-128.

The second group of LEDs is positioned on a vertical segment 56 midway between the unit circle 54 and the third group of LEDs. The segment 56 has a measure equal in length to the diameter of the unit circle 54. In this embodiment, the second LED group comprises nine LEDs 150-158. These LEDs are positioned to emphasize the values of the sine function for the special angles determined by the LEDs on the unit circle 54. Zero degrees at LED 72 on the unit circle will be zero measure 154 on the vertical segment, located at the midpoint of the segment 56. When the contact arm 140 is moved to activate LED 74, the angle formed by the pointer arm 62 and the horizontal axis 58 is 30 degrees. The value of the sine function for that angle is ½. The upper half of the vertical segment 56 is bisected, and LED 152 is activated for this angle. The next special move is to contact 114. This activates LED 76 which is $\sqrt{2}/2$ measure from the horizontal axis 58. That measure is used to locate the position of LED 152 on the vertical segment 56. LED 152 will be activated at the same time 76 is activated. LED 78 is 60 degrees on the arc of the circle 54; it is $\sqrt{3}/2$ measure from the horizontal axis 58. That measure is used to determine the position of LED 151. When LED 78 on the unit circular 54 is activated, LED 151 on the vertical segments 57 is also activated.

A 90 degree angle is indicated by LED 80 on the unit circle, which is located one unit from the horizontal axis. LED 150 is one unit from the midpoint 154 of the two unit segment 56, and will be activated when LED 80 is activated.

As the contact arm 140 continues to rotate from 90 degrees counter-clockwise, the angles increase but the values of the sine function decreases until the angle is 270 degrees. When LED 82 is activated, an angle of 120 degrees from LED 72 indicated. LED 151 on the vertical segment will again be activated. Diodes 160 and 161 are inserted into the circuit to prevent two different LEDs on the graph from being on at the same time. If the diodes 160 and 161 were not used, undesirable lighting of LEDs would occur. Diodes corresponding to diodes 160 and 161 are used at each LED comprising the vertical segment 56 except at LEDs 150 and 158 where they are not necessary.

When the contact arm 140 reaches contact 124, 270 degrees will be the measure of the indicated angle. The value of the sine function is negative at 270 degrees. LED 96 on the unit circle 54 is activated along with LED 158 on the vertical segment 56. This will indicate the minimum value of the sine function. The values of the sine function will start to increase as the contact arm 140 is moved from 270 degrees to 360 degrees or zero degrees.

The lower half of the two unit segment 56 has LEDs located at positions similar to those for the same upper half, but indicating negative values. The values are assigned $-\frac{1}{2}$, $-\sqrt{2}/2$, $-\sqrt{3}/2$, and $-1$, indicated by respective LEDs 155, 156, 157 and 158. As the contact arm 140 is moved counter-clockwise from 0 degrees to 360 degrees, the LEDs on the vertical line segment flash from 0 (LED 154) up to maximum 1 (LED 150), then down the segment 56 to minimum $-1$ (LED 158) and back again to 0 (LED 154). The movement of the flashes caused by momentary activation of the LEDs emphasizes when the sine function is increasing and decreasing.

Referring now to FIG. 6B, the third group of LEDs is located on the graph 60 of the sine function and the horizontal axis 58. In particular, this group of LEDs is placed on the PC board 68 at specific locations on the horizontal axis (LEDs 171-187) and the graph 60 of the sine wave (LEDs 171, 190-196, 179, 197-203, 187). The period of the sine function is $2\pi$ radians. The length associated with the period of this graph is 6.28 radians. The radius of the unit circle 10 is used to construct a length of 6 radii plus 0.28 of another. The length 6.28 is then bisected to determine 3.14 radians, to locate LED 179. The two lengths or 3.14 radians are then bisected to determine lengths of 1.57 radians and 4.71 radians, and to locate the LEDs 175 and 183, respectively. The four lengths of 1.57 radians are each bisected to determine the locations for LEDs 173, 177, 181 and 185, respectively. Each length of 1.57 radians is trisected to provide the locations for LEDs 172, 174, 176, 178, 180, 182, 184 and 186. This length is 1/12 of the length 6.28 radians.

Thus, seventeen special LED locations are determined on the horizontal axis from 0 radians (LED 171) to 6.28 radians (LED 187) corresponding to the special angles indicated by the first group of LEDs located on the unit circle. The angle 0 degrees indicated by LED 72 is equal to 0 radians, indicated by LED 171. The angle 30 degrees (LED 74) approximately equals 0.523 radians 82, the angle 90 degrees (LED 80) approximately equals 1.57 radians (LED 175), and so on, through the angle 360 degrees which is approximately 6.28 radians (LED 187).

The LEDs on the graph 60 of the sine wave function are located on the perpendiculars from each of the special locations on the horizontal axis. The sine of 0 degrees is 0, therefore, the LED 171 at 0 degrees will be used for the value 0. The sine of 30 degrees is ½, and LED 190 is located on the perpendicular at ½ the radius of the unit circle above the LED 172 at 0.523 radians. The LED 191 is located $\sqrt{2}/2$ above 0.875 radians (LED 173), the LED 192 is $\sqrt{3}/2$ above 1.046 radians (LED 174), The LED 193 is 1 above 1.57 radians (LED 175) and so on, to the LED 179 at 3.14 (89) where the sine's value is again 0. Progressing from 3.14 radians to 6.28 radians, the sine function values turn negative. The reflection image of the path taken in the interval from 0 to 3.14 can be used to locate the path for the special coordinates from 3.14 to 6.28 radians. LEDs 197–203 and 187 are placed at each determined location on the path of the values of the sine function.

FIG. 3 shows a cross-section of the demonstrator board 50. The back panel 64, PC board 68 and face cover 52 each have a hole ½ inch in diameter centered at the center 70 of the unit circle 54. The PC board 68 is spaced from the back panel 64 by 1/16 inch spacers (not shown) between to allow space for pins of the LEDs which are inserted through holes formed in the PC board 68. The face cover 52 is spaced from the PC board 68 by ¼ inch spacers. Plastic grommets 204, 206 and 208 are installed within the ½ inch holes formed in the respective boards 52, 114 and 64. The crank shaft 202 of the hand crank 66 is inserted through grommets 204, 206, 208. A threaded bolt 200 extends through the shaft 202, with sufficient threads protruding from the face board 52 to receive the pointer 62 and to be secured by nut 210. The shaft 202 has a shoulder 203 which registers the position of the shaft 202 with the back plate 64.

The contact arm 140 is installed on the crank shaft 202 between the PC board 68 and the back panel 64. The contact arm 140 has a bend 140A formed therein as a spring to urge the contacts 142, 144 on the arm 140 into contact with the wiring ring 110 and the respective contacts formed on the lower surface 68A of the PC board 68.

The LEDs are mounted on the PC board 68, but protrude upwardly into holes formed in the cover plate 52 at the locations of the LEDs. The holes are visible in FIG. 1. For example, LED 72 is visible through hole 53 formed in the cover plate 52. In this embodiment, the plate 52 is formed of a rigid opaque material, but other arrangements will be readily apparent to those skilled in the art. For example, the plate 52 could be formed of a translucent material, with an opaque coating pattern defined thereon which defines the "hole" pattern at places in which the coating pattern is removed or does not appear.

As shown in FIGS. 1 and 2, a plastic frame 65 is fitted around the periphery of the demonstrator board 50.

FIG. 5 illustrates an electrical schematic for the board 50.

Figure 7A:
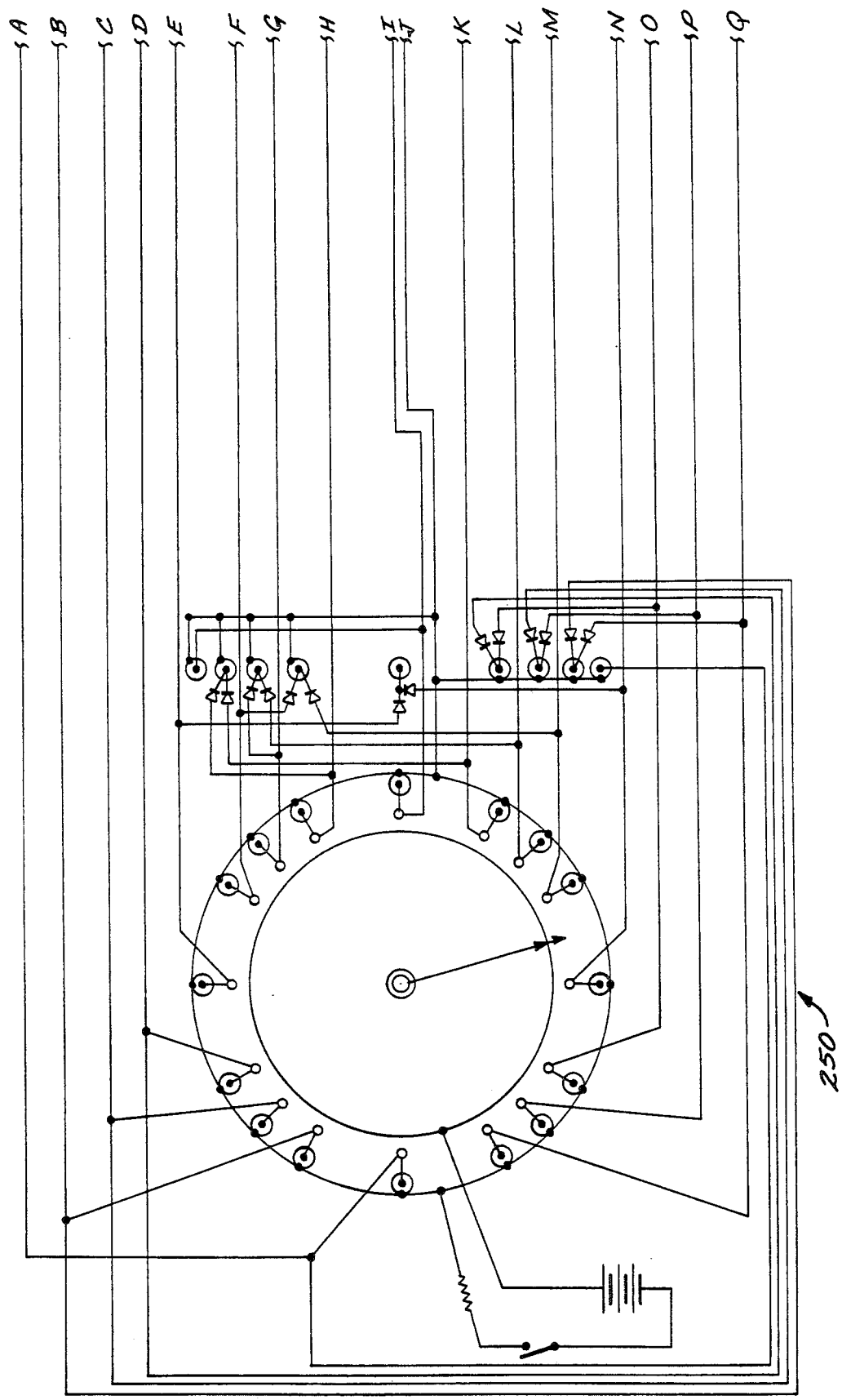
FIGS. 7A-7B are schematic layout diagrams depicting a second embodiment of the invention, a cosine demonstrator board for illustrating the cosine function.
Figure 7B:
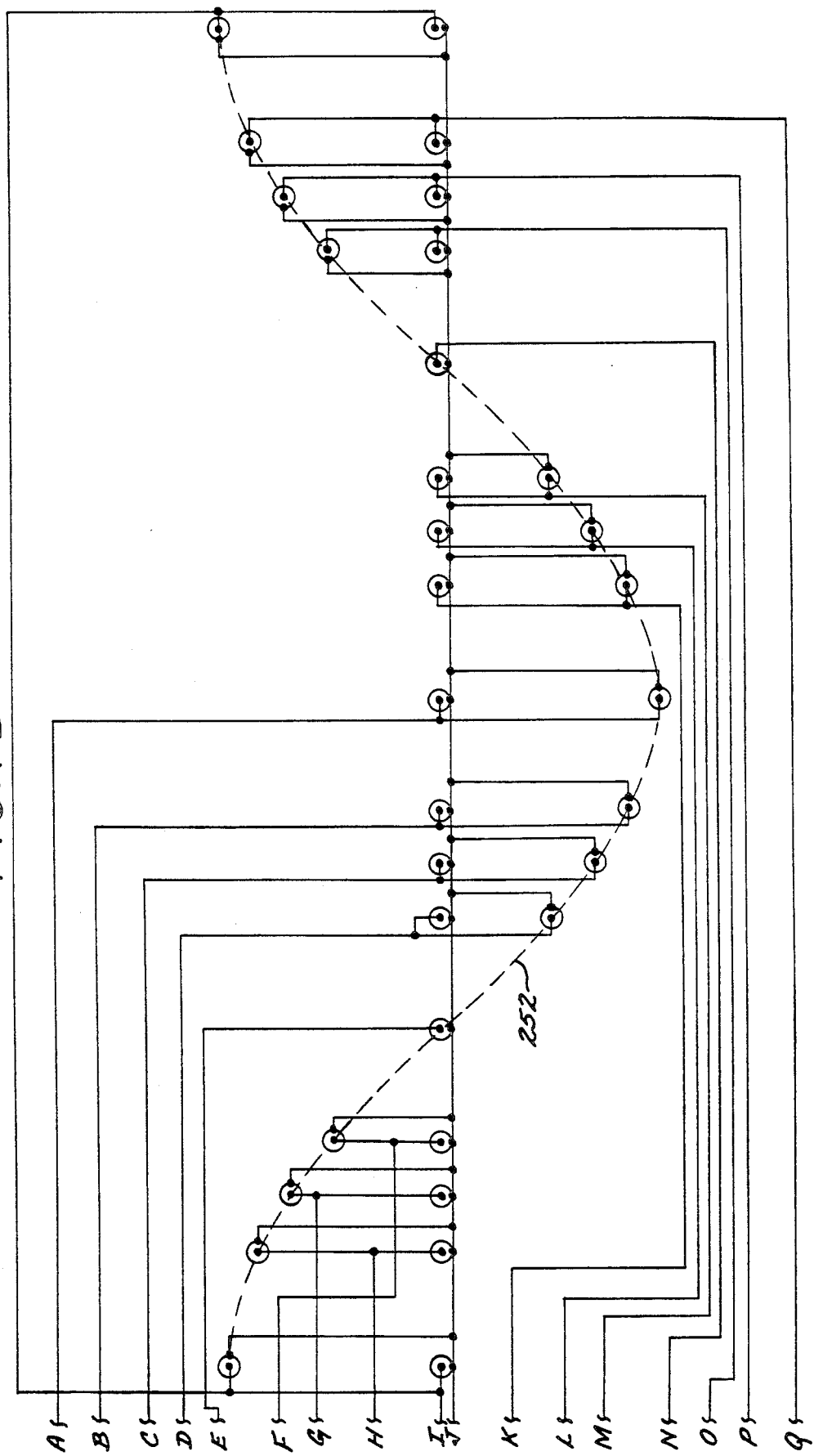

FIGS. 7A and 7B illustrate an alternate embodiment of a demonstrator board 250 embodying the invention. This board 250 is similar to the board 50 of FIGS. 1–6, except that it demonstrates the cosine function instead of the sine function. Thus, the path 252 of the illustrated sine function. Thus, the path 252 of the illustrated function defines the cosine function, and the three groups of LEDs are placed at special locations for the cosine functions, in a manner analogous to that described hereinabove for the sine function.

Figure 8A:
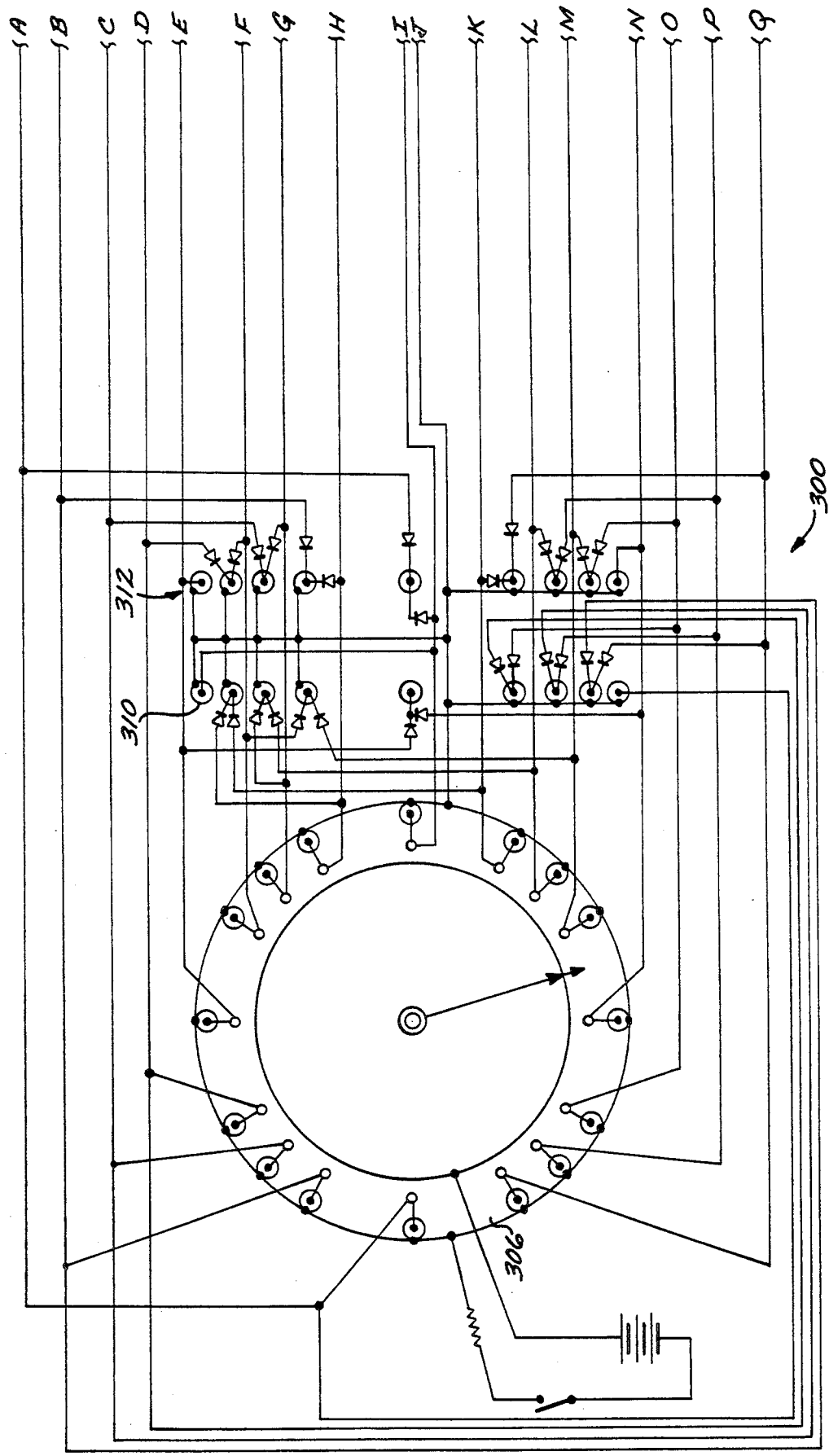
FIGS. 8A-8B are schematic layout diagrams depicting a third embodiment of the invention, a sine-cosine demonstrator board for illustrating both the sine and cosine functions.
Figure 8B:
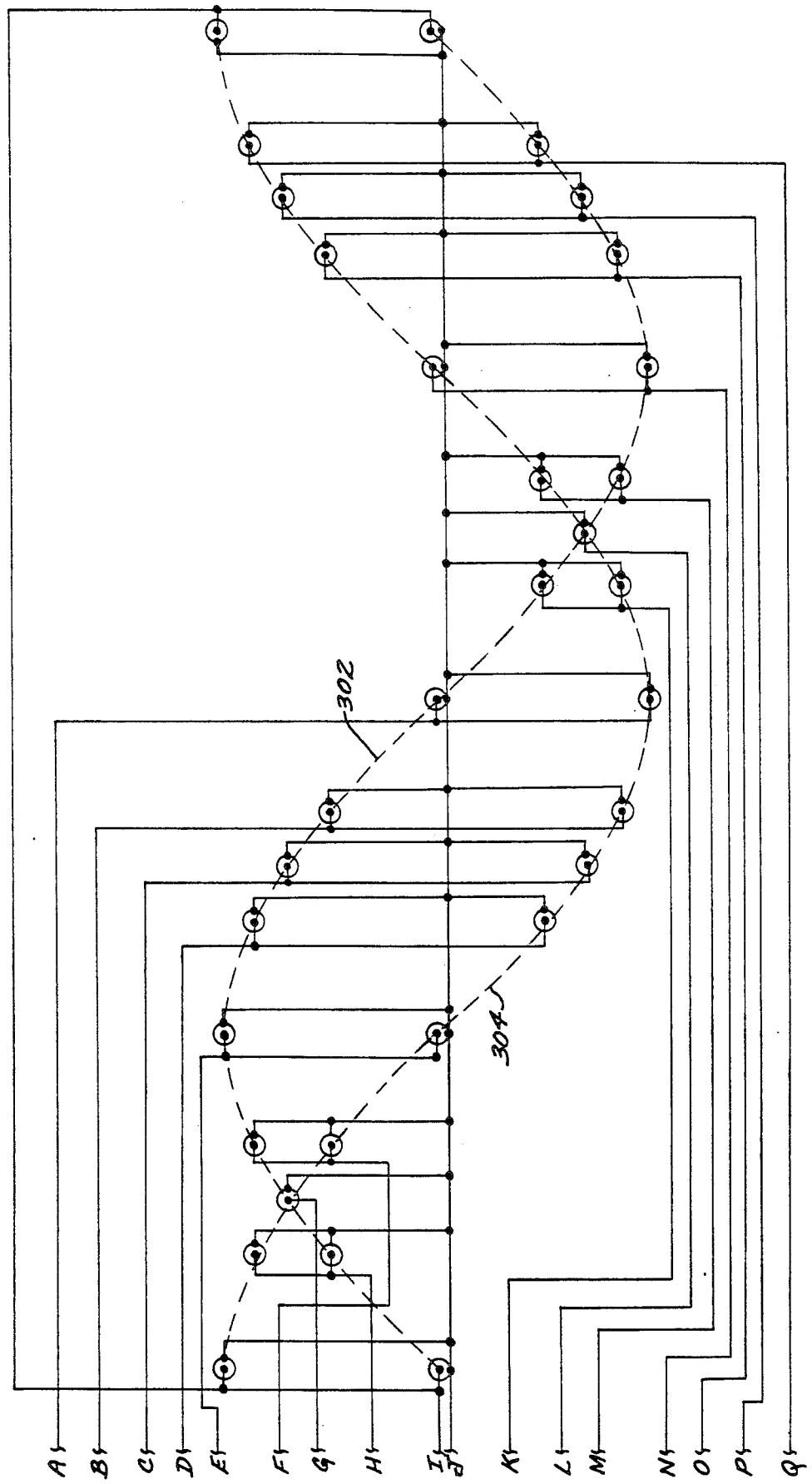

FIGS. 8A and 8B illustrate a third embodiment of the invention for illustrating both the sine and cosine functions. In this embodiment, the board 300 is similar to that of FIGS. 1–6, except that both the path 302 of the sine function and the path 304 of the cosine function are illustrated. As the contact arm is rotated into a particular special angle indicated by a LED on the unit circle 306, the corresponding values of the sine and cosine functions will be indicated by activating the appropriate LED on the respective paths 302 and 304. Instead of having a single vertical segment as in the cases of the board 50 and the board 250, in this embodiment, two adjacent vertical segments 310 and 312 of LEDs are provided. One of the segments, for example segment 310, is used to illustrate the value of the sine function for the selected angle, and the other segment 312 illustrates the value of the cosine function. LEDs of different colors may be used to differentiate between the two segments, and as well between the two graphs 302 and 304.

Other embodiments of the invention may be used to illustrate others of the trigonometric circular function, e.g., the tangent.

The teaching profession needs as many teaching aids as possible to convey knowledge, skills, and concepts to the students of all ages in our technical and complex world of today. The demonstrator board explained in this application is another means by which this can be accomplished.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A trigonometric function demonstrator apparatus, comprising:

a front surface panel;

at least two groups of selectively activatable light emitters, a first group of said light emitters being disposed at selected locations around the periphery of a unit circle defined on said front surface panel, a second group of said light emitters being disposed in relation to coordinates defined on said front surface panel to indicate the value of said trigonometric function at particular angles indicated by said first group of light emitters;

angle pointing means centered on the center of said unit circle and being rotatable about said unit circle to illustrate selected angles on the unit circle; and operator manipulated means for mechanically rotating said pointing means and activating selected corresponding ones of said first and second groups of said light emitters when said angle pointing means is pointing to particular angles about said unit circle.

2. The demonstrator apparatus of claim 1 wherein said operator manipulated means comprises a hand crank means.

3. The demonstrator apparatus of claim 2 wherein said angle pointing means comprises a pointer member rotated about said unit circle by said hand crank means.

4. The demonstrator apparatus of claim 2 further characterized by a back panel, and wherein said hand crank means protrudes from said back panel for manipulation by the user of said apparatus.

5. The demonstrator apparatus of claim 2 wherein said means for activating selected corresponding ones of said light emitters comprises:

a printed wiring pattern defined on a surface disposed substantially parallel to said front surface panel and defining corresponding pairs of contacts which if electrically connected will activate selected ones of said first and second groups of light emitters; and an electrically conductive wiper arm arranged to be selectively rotated adjacent said wiring pattern by said operator manipulated means to selectively connect said pairs of contacts at particular positions of said wiper arm, thereby selectively activating said selected ones of said first and second groups of light emitters.

6. The demonstrator apparatus of claim 5 further comprising a printed circuit board, said surface on which said printed wiring pattern is defined comprising a surface of said circuit board.

7. The demonstrator apparatus of claim 1 wherein said light emitters comprise light emitting diodes.

8. The demonstrator apparatus of claim 1 further comprising a battery for providing power to activate said light emitters.

9. The demonstrator apparatus of claim 1 wherein said trigonometric function is the sine function.

10. The demonstrator apparatus of claim 1 wherein said trigonometric function is the cosine function.

11. The demonstrator apparatus of claim 1 further comprising a third group of selectively activatable light emitters, said emitters of said third group being disposed along a vertical segment equal in length to the diameter of said circle, said light emitters arranged to indicate the value of said trigonometric function for respective corresponding angles indicated by said first group of light emitters, and wherein said operator manipulated means further comprises means for activating selected corresponding ones of said third group corresponding to the value of said trigonometric function for said respective corresponding angles.

12. The demonstrator apparatus of claim 1 wherein said second group of light emitters is disposed to indicate the values of at least first and second trigonometric functions, and wherein said operator manipulated means comprises means for activating selected ones of said third group in order to illustrate the values of said first and second functions in correspondence to the particular angle value indicated by said activated one of said first group of light emitters.

13. The demonstrator apparatus of claim 12 wherein said first trigonometric function is the sine function, and said second trigonometric function is the cosine function.

14. A trigonometric function demonstrator apparatus, comprising:

a front surface panel;

three groups of selectively activatable light emitters, a first group being disposed at selected locations around the periphery of a unit circle defined on said front surface, a second group being disposed in relation to coordinates defined on said front surface panel to indicate the value of said trigonometric function at particular angles indicated by said first group of light emitters, emitters of a third group being disposed along a vertical segment visible on said front surface panel and equal in length to the diameter of said circle, said light emitters arranged to indicate the value of said trigonometric function for respective corresponding angles indicated by said first group of light emitters;

angle pointing means centered on the center of said unit circle and being rotatable about said unit circle to illustrate selected angles on the unit circle; and operator manipulated means for mechanically rotating said pointing means and activating selected corresponding ones of said first, second and third groups of said light emitters when said angle pointing means is pointing to particular angles about said unit circle.

15. The demonstrator apparatus of claim 14 wherein said operator manipulated means comprises a hand crank means.

16. The demonstrator apparatus of claim 15 wherein said angle pointing means comprises a pointer member rotated about said unit circle by said hand crank means.

17. The demonstrator apparatus of claim 15 further characterized by a back panel, and wherein said hand crank means protrudes from said back panel for manipulation by the user of said apparatus.

18. The demonstrator apparatus of claim 15 wherein said means for activating selected corresponding ones of said light emitters comprises:

a printed wiring pattern defined on a surface disposed substantially parallel to said front surface panel and defining corresponding pairs of contacts which if electrically connected will activate selected ones of said first, second and third groups of light emitters; and an electrically conductive wiper arm arranged to be selectively rotated adjacent said wiring pattern by said operator manipulated means to selectively connect said pairs of contacts at particular positions of said wiper arm, thereby selectively activating said selected ones of said first, second and third groups of light emitters.

19. The demonstrator apparatus of claim 18 further comprising a printed circuit board, said surface on which said printed wiring pattern is defined comprising a surface of said circuit board.

20. The demonstrator apparatus of claim 14 wherein said light emitters comprise light emitting diodes.

21. The demonstrator apparatus of claim 14 further comprising a battery for providing power to activate said light emitters.

22. The demonstrator apparatus of claim 14 wherein said trigonometric function is the sine function.

23. The demonstrator apparatus of claim 14 wherein said trigonometric function is the cosine function.

24. The demonstrator apparatus of claim 14 wherein said second group of light emitters is disposed to indicate the values of at least first and second trigonometric functions, and wherein said operator manipulated means comprises means for activating selected ones of said second group in order to illustrate the values of said first and second functions in correspondence to the particular angle value indicated by said activated one of said first group of light emitters.

25. The demonstrator apparatus of claim 24 wherein said first trigonometric function is the sine function, and said second trigonometric function is the cosine function.

26. The demonstrator apparatus of claim 24 further characterized in that said third group of light emitters are arranged in first and second vertical segments, the emitters in said first segment being selectively activated to indicate the value of said firs function for a particular angle indicated by the activated one of said first group of emitters and the emitters in said second segment being selectively activated to indicate the value of said second function for said particular angle.

* * * * *